(12) United States Patent
Dong et al.

(10) Patent No.: US 8,226,119 B2
(45) Date of Patent: Jul. 24, 2012

(54) CONTINUOUSLY VARIABLE DEPLOYMENT AIRBAG

(75) Inventors: Ke Dong, Troy, MI (US); Jenne-Tai Wang, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 270 days.

(21) Appl. No.: 12/581,240

(22) Filed: Oct. 19, 2009

(65) Prior Publication Data

US 2010/0109306 A1    May 6, 2010

Related U.S. Application Data

(60) Provisional application No. 61/110,681, filed on Nov. 3, 2008.

(51) Int. Cl.
B60R 21/16 (2006.01)
B60R 21/2334 (2011.01)
B60R 21/2338 (2011.01)

(52) U.S. Cl. .................................................. 280/743.2

(58) Field of Classification Search ............... 280/743.2, 280/743.1, 730.1
See application file for complete search history.

(56) References Cited

U.S. PATENT DOCUMENTS

| | | | |
|---|---|---|---|
| 6,189,928 B1 | 2/2001 | Sommer et al. | |
| 6,250,677 B1 | 6/2001 | Fujimura | |
| 6,315,323 B1 | 11/2001 | Pack, Jr. | |
| 6,616,177 B2 | 9/2003 | Thomas et al. | |
| 6,709,010 B2 * | 3/2004 | Dominissini et al. | 280/730.2 |
| 6,808,205 B2 | 10/2004 | Hawthorn et al. | |
| 6,816,766 B2 | 11/2004 | Sala et al. | |
| 6,857,659 B2 | 2/2005 | Webber | |
| 6,869,103 B2 | 3/2005 | Ryan et al. | |
| 7,000,947 B2 | 2/2006 | Kumagai et al. | |
| 7,021,657 B2 | 4/2006 | Kassman et al. | |
| 7,144,036 B2 | 12/2006 | Kai | |
| 7,152,877 B2 | 12/2006 | Hasebe et al. | |
| 7,249,783 B2 | 7/2007 | Parkinson et al. | |
| 7,275,763 B2 | 10/2007 | Thomas et al. | |
| 7,354,064 B2 | 4/2008 | Block et al. | |
| 7,377,548 B2 | 5/2008 | Bauer et al. | |
| 7,419,184 B2 | 9/2008 | Green et al. | |
| 7,695,014 B2 * | 4/2010 | Parks et al. | 280/743.2 |
| 2006/0170202 A1 * | 8/2006 | Block et al. | 280/743.2 |
| 2006/0186656 A1 | 8/2006 | Kumagai | |
| 2007/0205591 A1 | 9/2007 | Bito | |
| 2008/0228358 A1 | 9/2008 | Wang et al. | |

FOREIGN PATENT DOCUMENTS

JP          9240403          9/1997

* cited by examiner

*Primary Examiner* — Ruth Ilan
*Assistant Examiner* — Joselynn Y Sliteris

(57) ABSTRACT

An occupant restraint device includes an inflatable airbag cushion, a tether including a first end connected to the airbag cushion and a second end connected to a tether control mechanism. The tether control mechanism including a tether payout mechanism and a tether length adjustment mechanism. The tether length adjustment mechanism controls a length of tether available for payout by the tether payout mechanism, and the tether payout mechanism is operationally decoupled from the tether length adjustment mechanism.

9 Claims, 5 Drawing Sheets

CONTINUOUSLY VARIABLE DEPLOYMENT AIRBAG

CROSS-REFERENCE TO RELATED APPLICATIONS

This application claims the benefit of U.S. Provisional Application No. 61/110,681, filed Nov. 3, 2008, which is hereby incorporated herein by reference.

TECHNICAL FIELD

This disclosure is related to occupant restraint systems.

BACKGROUND

The statements in this section merely provide background information related to the present disclosure and may not constitute prior art.

Vehicles are equipped with airbag assemblies including an inflatable airbag cushion for supplemental occupant restraint. Known airbag assemblies can be located, for example, in a steering wheel hub, within an instrument panel recess, within a seat, within interior trims, and within door panels to protect occupants during an impact event.

Known airbag assemblies can include an inflatable airbag cushion and an inflator device in fluid communication with the inflatable cushion. In a driver-side airbag assembly, a base plate can support the inflator device at the interior of the steering wheel opposing the driver. A mouth of the airbag cushion is disposed relative to the inflator device with a perimeter portion of the mouth being held between the base plate and a retainer to secure the uninflated airbag cushion relative to the inflator device. When the airbag assembly is located elsewhere in the vehicle, the inflator device can be held within a trough-like housing with the airbag cushion secured along the walls of the housing. In each location, the inflator device can inject pressurized inflation gas into the cushion upon activation. It is known that design parameters of an airbag system include a physical shape and size of a deploying airbag cushion, including a depth of the deployed airbag cushion. It is known to use a tether to control depth, shape and size of the deployed airbag.

SUMMARY

An occupant restraint device includes an inflatable airbag cushion, a tether including a first end connected to the airbag cushion and a second end connected to a tether control mechanism. The tether control mechanism including a tether payout mechanism and a tether length adjustment mechanism. The tether length adjustment mechanism controls a length of tether available for payout by the tether payout mechanism, and the tether payout mechanism is operationally decoupled from the tether length adjustment mechanism.

BRIEF DESCRIPTION OF THE DRAWING

One or more embodiments will now be described, by way of example, with reference to the accompanying drawings, including.

DETAILED DESCRIPTION

Figure 1:
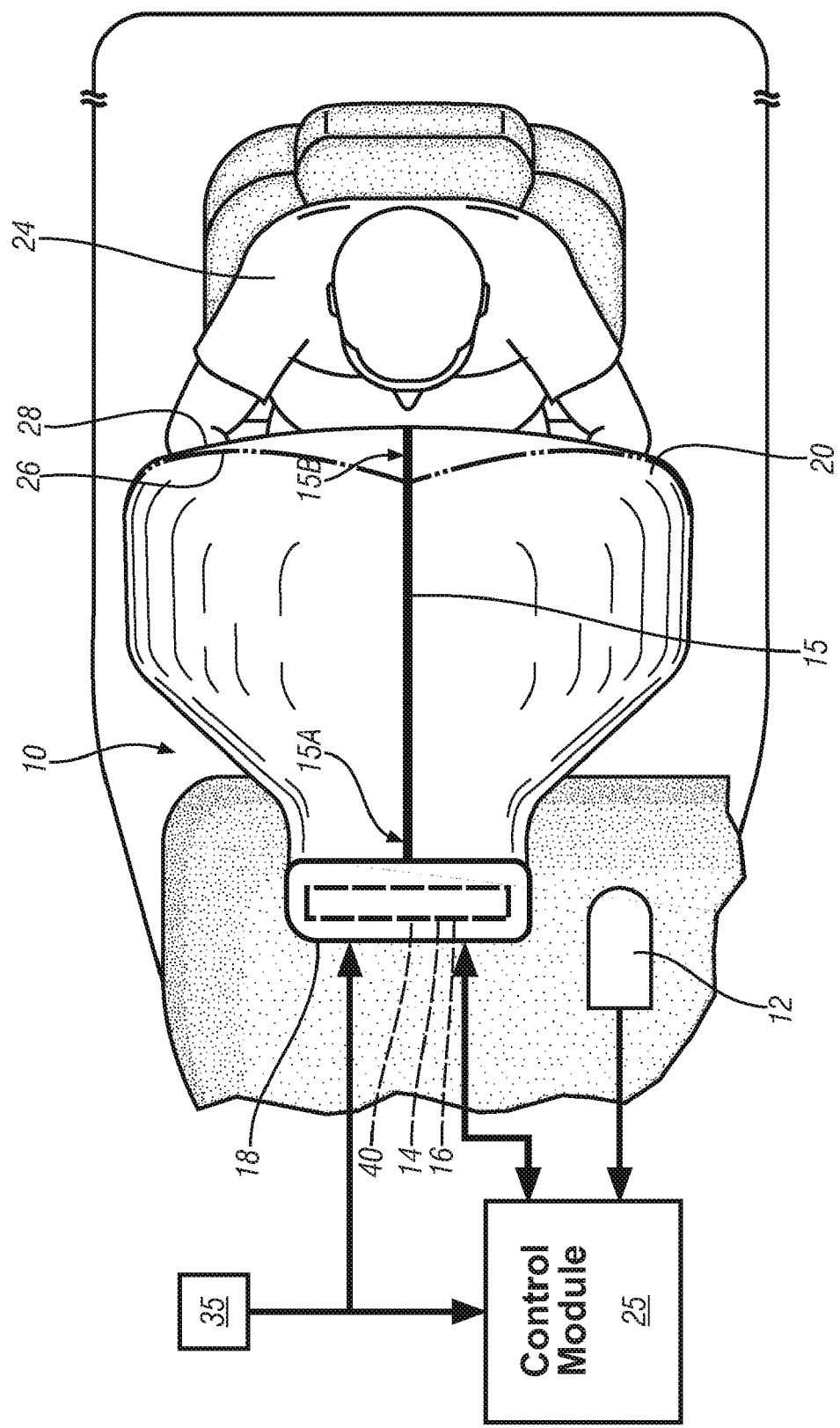
FIG. 1 is a schematic diagram of an exemplary vehicle system in accordance with the present disclosure.

Referring now to the drawings, wherein the showings are for the purpose of illustrating certain exemplary embodiments only and not for the purpose of limiting the same, FIG. 1 illustrates a top view of a portion of a passenger compartment of a vehicle including an airbag system 10 having an inflatable airbag cushion 20. The airbag cushion 20 is depicted in a deployed state in relation to an occupant 24. Like numerals refer to like elements in the various figures.

The airbag system 10 includes a housing 18 with an openable cover 16, the airbag cushion 20, an extendable tether 15, a tether control mechanism 40, and an inflator device 14. The airbag cushion 20 is stored in the housing 18 with the cover 16 closed unless deployed.

A first end 15A of the tether 15 connects to the tether control mechanism 40, and a second end 15B of the tether 15 connects to the airbag cushion 20. The tether 15 constrains a portion of the airbag cushion 20 to control its deployed shape. As shown, the airbag cushion 20 is deployed to a first state 28, limited by deployment of the tether 15 to a first deployed length. Also shown, the airbag cushion 20 is deployed to a second state 26, limited by deployment of the tether 15 to a second deployed length that is less than the first deployed length. The first and second deployed states 28 and 26 of the airbag cushion 20 are non-limiting illustrations of deployments of an embodiment of the airbag cushion 20. The deployed length(s) of the tether(s) 15 is variable between maximum and minimum preferred deployable lengths. The tether control mechanism 40 controls the variable preferred deployable length of the tether(s) 15.

The term "deployable length" is used to describe an achievable length that may occur responsive to an event, e.g., in response to deployment of the airbag cushion 20. The term "deployed length" is used to describe an achieved length that occurs during an event, e.g., that occurs upon deployment of the airbag cushion 20.

A control module 25 signally connects to occupant sensing device(s) 12 and one or more vehicle dynamics sensing device(s) 35. The control module 25 is signally connected to an actuator associated with the inflator device 14 of the airbag system 10 to effect deployment of the airbag cushion 20. Control module 25 is also signally connected to tether control mechanism 40 to control the preferred deployable length(s) of the tether(s) 15.

The occupant sensing device(s) 12 is an element of an occupant identification and verification system that dimensionally characterizes the occupant 24 and communicates such information to the control module 25. The control module 25 can include an occupant classification system, which includes a system for occupant detection and identification, including, e.g., a facial recognition system, an occupant-to-vehicle communications interface, and an occupant dimensional analysis system. The control module 25 dimensionally characterizes the occupant 24, including, e.g., body size, mass, seating position and seating height. The occupant classification system can include operator-controllable settings, including an interactive system and a feedback system. This can include identifying the presence of a child carseat and other elements. This can include retrieving and verifying biometric and personal preference information for specific occupants of a passenger vehicle.

The vehicle dynamics sensing device(s) 35 is preferably an element of a pre-crash sensing system and a crash sensing system. The vehicle dynamics sensing device(s) 35 is configured to detect a present vehicle position and vehicle dynamics relative to external objects, e.g., other vehicles or stationary objects. The control module 25 preferably includes signal processing capability, extra-vehicle communications systems, and algorithms that can detect and identify an impending vehicle situation such as an impact or pre-impact condition based on information from the vehicle dynamics sensing device(s) 35. When the one of the pre-crash sensing system and the crash sensing system senses an impact greater than a threshold, e.g., as sensed by the vehicle dynamics sensing device(s) 35, the inflator device 14 is controlled to release gas, thus inflating the airbag cushion 20.

The control module 25 controls the airbag system 10 by configuring the deployment characteristics of the airbag cushion 20 based upon the dimensional characteristics of the occupant 24 and information obtained from the pre-crash sensing system and the crash sensing system. This includes configuring the tether control mechanism 40 to control the variable preferred deployable length(s) of the tether(s) 15 corresponding to the retrieved and verified biometric and personal preference information. For example, the control module 25 may limit the deployment(s) of the airbag cushion 20 by limiting the preferred deployable length(s) of the tether(s) 15 to achieve a preferred deployment of the airbag cushion 20. The airbag cushion 20 is shown in a deployed state. The illustration is schematic and the components are not drawn to scale. Preferably the control module 25 limits extension(s) of the tether(s) 15 by presetting and resetting the depth and shape of the airbag cushion 20 associated with the present occupant 24. This includes a continuously variable adjustment of the deployable length of the tether(s) 15 that is reconfigurable and can include a tailored airbag depth and shape to accommodate different sizes of occupants and different vehicle impact conditions.

The deployed state of the airbag cushion 20 is controlled using the tether(s) 15 whose deployable and deployed length(s) are adjusted using the tether control mechanism 40. As shown schematically in FIGS. 2-5, the tether control mechanism 40 includes a tether payout mechanism 50 and a tether length adjustment mechanism 60. The tether payout mechanism 50 is preferably operationally decoupled from the tether length adjustment mechanism 60.

The tether length adjustment mechanism 60 includes a device that controls the length of the tether 15 available for payout thereby adjusting the deployed length of the tether 15 and thus adjusting deployment of the portion of the airbag cushion 20 connected to the tether 15 when the airbag cushion 20 is inflated. The deployable length of the tether 15 is infinitely variable between a maximum and a minimum deployed length. The tether payout mechanism 50 includes a device that unwinds or otherwise pays out the available length of tether 15 to the preferred deployed length when the airbag cushion 20 is being deployed.

Figure 2:
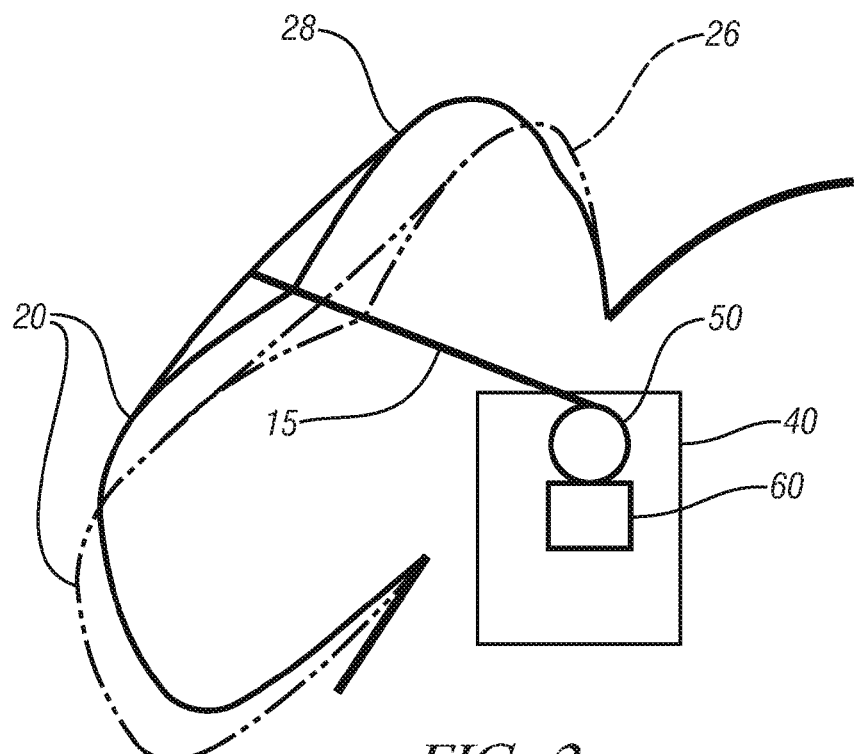
FIGS. 2 and 3 are schematic diagrams of exemplary deployed airbag cushions in accordance with the present disclosure.

FIG. 2 shows an embodiment of the airbag system 10 including the airbag cushion 20 with a single tether 15 and the associated tether control mechanism 40 including a tether payout mechanism 50 and a tether length adjustment mechanism 60. The airbag cushion 20 is shown in two deployed states, i.e., the first deployed state 28 and the second deployed state 26.

As shown, the deployed airbag cushion 20 is deployed to the first deployed state 28, limited by extension of the tether 15 to a first preferred deployed length. Also shown, the airbag cushion 20 is deployed to the second deployed state 26, limited by extension of the tether 15 to a second preferred deployed length that is less than the first preferred deployable length. The first and second deployed states 28 and 26 of the airbag cushion 20 are illustrative. The tether control mechanism 40 including the tether payout mechanism 50 and the tether length adjustment mechanism 60 variably control extension of the tether 15 to a preferred deployed length, including to the first and second preferred deployable lengths.

Figure 3:
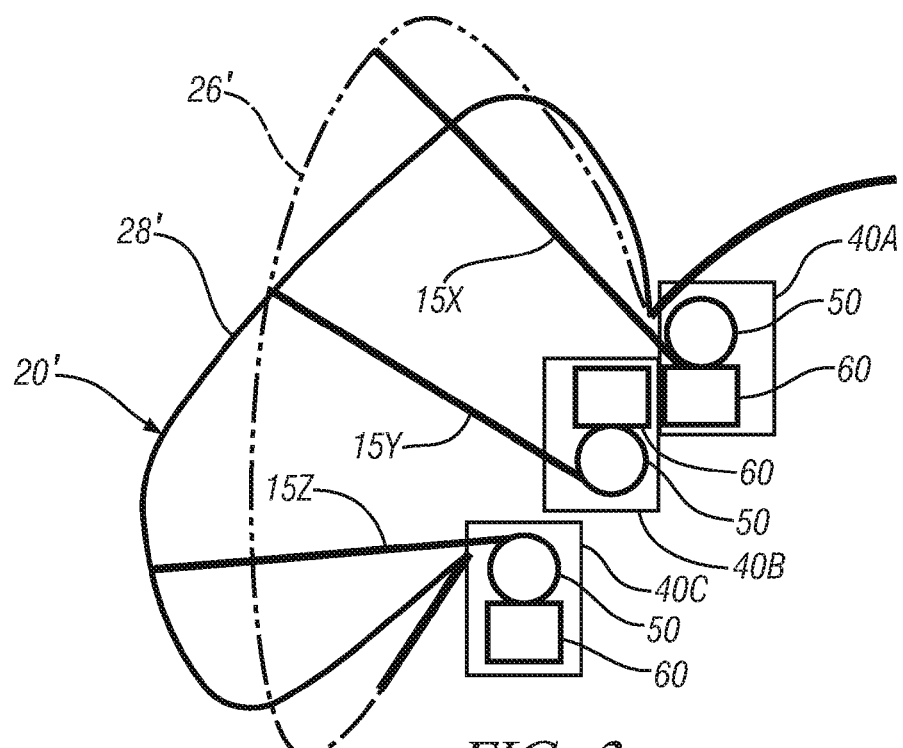

FIG. 3 shows an embodiment of the airbag system 10 including a airbag cushion 20' in first and second deployed states 28' and 26'. The airbag cushion 20' is attached to three tethers 15X, 15Y, and 15Z and associated tether control mechanisms 40A, 40B, and 40C, each including a tether payout mechanism 50 and a tether length adjustment mechanism 60. As shown, the three tethers 15X, 15Y, and 15Z are attached to the airbag cushion 20' at three locations to control the deployed shape of the airbag cushion 20'. Attachment of the three tethers 15X, 15Y, and 15Z at three locations on the airbag cushion 20' is meant to be illustrative.

To achieve the first deployed state 28' of the airbag cushion 20', the three tethers 15X, 15Y, and 15Z are deployed to first deployed lengths as shown. The airbag cushion 20' can be reconfigured to a second deployed state, e.g., that depicted by 26', by adjusting deployed lengths of one, two, or all three of the three tethers 15X, 15Y, and 15Z using the associated tether control mechanisms 40A, 40B, and 40C. As shown with reference to the airbag cushion 20' reconfigured to the second deployed state 26', the deployed length of tether 15X is lengthened, the deployed length of tether 15Y is unchanged, and the deployed length of tether 15Z is shortened. The first and second deployed states 28' and 26' are meant to be non-limiting illustrations of the concepts described herein.

Figure 4:
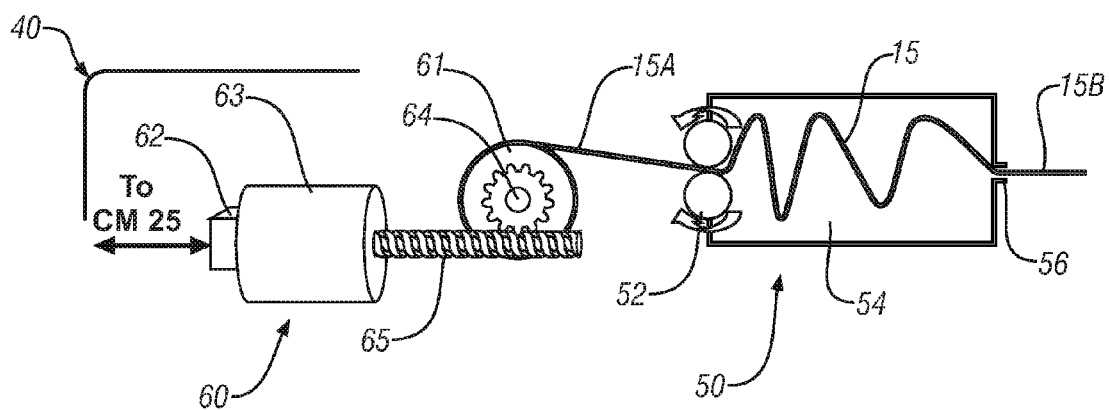
FIGS. 4, 5, and 6 are schematic diagrams of embodiments of tether length adjustment mechanisms in accordance with the present disclosure.

FIG. 4 shows an embodiment of the tether control mechanism 40 including tether payout mechanism 50 and tether length adjustment mechanism 60. The tether length adjustment mechanism 60 controls extension of the associated tether 15 to a preferred deployed length. The tether length adjustment mechanism 60 includes a rotatable spool 61 to which the first end of the tether 15A is fixedly attached and on which a portion of the tether 15 is wound. The spool 61 is rigidly and rotationally connected to a gear 64. An actuator 63 connects to and rotates a worm gear 65. The worm gear 65 meshingly engages gear 64 to rotate the spool 61, including one of extending and retracting the tether 15. The actuator 63 includes a position feedback sensor 62 that signally connects to the control module 25. The actuator 63 is operatively connected to the control module 25, which controls operation thereof. The gear 64 and worm gear 65 have self-locking capabilities, allowing torque to be transferred from the actuator 63 to the spool 61 and prohibiting torque transfer from the spool 61 to the actuator 63.

The tether payout mechanism 50 pays out the tether 15 during deployment of the airbag cushion 20. The tether payout mechanism 50 is configured to contain the deployable length of the tether unwound from the spool 61 and in this embodiment includes a tether tensioner 52, a tether storage chamber 54, and a passage 56. The tether 15 passes through the tether tensioner 52 into the tether storage chamber 54. The tether tensioner 52 preferably includes torsion springs that apply tension on the tether 15 away from the spool 61. The deployable length of the tether 15 contained in the tether storage chamber 54 passes through passage 56 to the second end of the tether 15B that connects to the airbag cushion 20.

In operation, the control module 25 calculates a preferred deployment configuration for the airbag cushion 20, including determining a preferred deployed length of the associated tether 15 in event of deployment of the airbag cushion 20. The control module 25 commands the tether control mechanism 40 to preset a preferred deployable length of the tether 15 associated with the preferred deployed length of the tether 15 and the preferred deployed configuration for the airbag cushion 20.

The actuator 63 is activated and applies torque to rotate the spool 61 to extend or retract a portion of the tether 15. Length of extension or retraction of the tether 15 is measured using the position feedback sensor 62. The tether tensioner 52 applies tension on the tether 15 and draws a portion of the tether 15 deployed from the spool 61 into the chamber 54. A portion of the tether 15 associated with the preferred deployable length for the tether 15 is pre-loaded into the chamber 54.

Inflation of the airbag cushion 20 pulls the tether 15 out of chamber 54 until the tether 15 is fully paid out to the preferred deployed length for the tether 15. The deployed length of the tether 15 depends upon the preferred deployable length of the tether 15 pre-loaded into the chamber 54. The preferred deployable length for the tether 15 is variably adjustable in a continuous fashion by the rotation of the spool 61 associated with rotation of the actuator 63.

Figure 5:
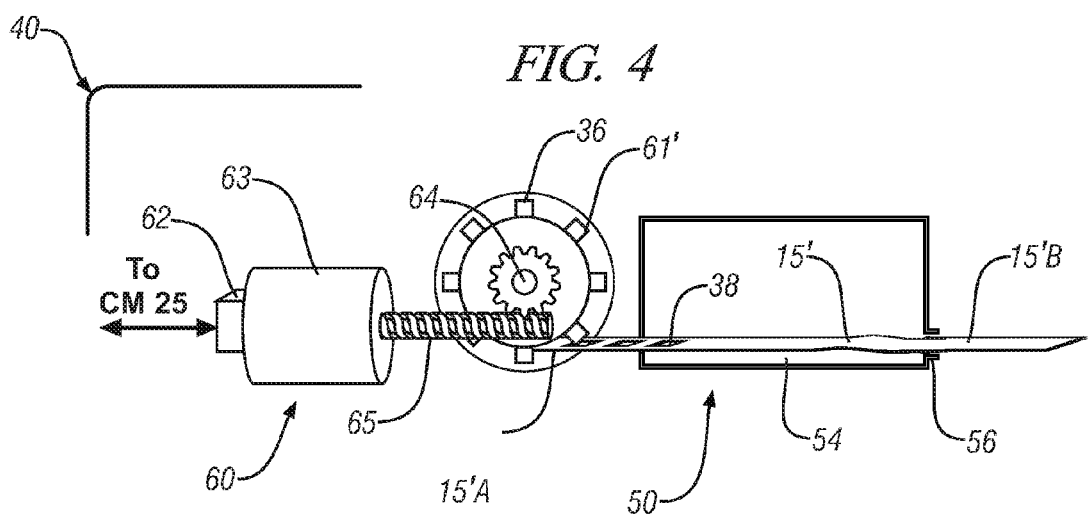

FIG. 5 shows another embodiment of the tether control mechanism 40 including tether payout mechanism 50 and tether length adjustment mechanism 60. The tether length adjustment mechanism 60 controls extension of the associated tether 15' to a preferred deployable length. The tether length adjustment mechanism 60 includes a rotatable spool 61' to which the first end of the tether 15'A is fixedly attached and on which a portion of the tether 15' is wound. The spool 61' is rigidly and rotationally connected to a gear 64. The spool 61' is a gear-like rotor with circumferentially located teeth 36 projecting radially. A portion of the tether 15' includes holes 38 that meshingly engage the pitch of the teeth 36. An actuator 63 connects to and rotates a worm gear 65. The worm gear 65 meshingly engages gear 64 to rotate the spool 61', extending or retracting the tether 15' in response to rotation of the actuator 63. The actuator 63 operatively connects to the control module 25. The actuator 63 includes the position feedback sensor 62 signally connected to the control module 25. The gear 64 and worm gear 65 have self-locking capabilities, allowing torque to be transferred from the actuator 63 to the spool 61' and prohibiting torque transfer from the spool 61' to the actuator 63.

The tether payout mechanism 50 pays out the tether 15' during deployment of the airbag cushion 20. The tether payout mechanism 50 in this embodiment includes a tether storage chamber 54 and a passage 56. The tether 15' passes into the tether storage chamber 54. The teeth 36 move the tether 15' away from the spool 61' and into the tether storage chamber 54. A portion of the tether 15' is contained in the tether storage chamber 54, and passes through passage 56 and connects to the airbag cushion 20 at the second end of the tether 15'B.

Figure 6:
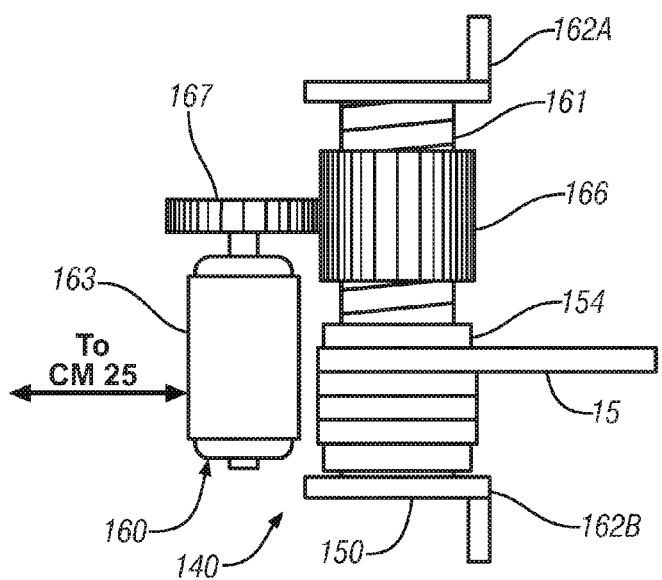

FIG. 6 shows another embodiment of a tether control mechanism 140, including tether payout mechanism 150 and tether length adjustment mechanism 160. The tether payout mechanism 150 is decoupled from the tether length adjustment mechanism 160 in that the tether length adjustment mechanism 160 can be preset without engaging or interacting with the tether payout mechanism 150. Thus, the tether length adjustment mechanism 160 presets to a position to achieve the preferred deployed length of the tether 15 during ongoing operation of the vehicle, including in response to a change in a seat occupant. The tether payout mechanism 150 functions only during deployment of the airbag cushion 20, when deployment of the tether 15 is controlled to the preferred deployed length in accordance with the preset position to achieve the preferred deployed length of the tether 15 executed by the tether length adjustment mechanism 160.

The exemplary tether length adjustment mechanism 160 includes a threaded stationary bolt 161, a preset nut 166, an actuator 163 and a preset pinion 167, and first and second end brackets 162A and 162B. The preset nut 166 translates linearly along a longitudinal axis of the threaded stationary bolt 161 when rotated thereon. The preset pinion 167 engages the preset nut 166. Preferably, the preset nut and preset pinion include complementary teeth for meshing engagement. However, any engagement configuration effective to transfer rotation of the preset pinion to the preset nut is suitable. Additionally, while pinion engagement with the preset nut is described for rotating the preset nut, one having ordinary skill in the art will readily recognize alternatives for imparting rotation to the preset nut and the pinion/nut arrangement set forth in this disclosure is understood to be exemplary and non-limiting. The actuator 163 signally and operatively connects to the control module 25.

In response to a control signal from the control module 25, the actuator 163 rotates the preset pinion 167, which in turn rotates the preset nut 166 to linearly translate it along the longitudinal axis of the threaded stationary bolt 161. The actuator 163 includes a rotational locking mechanism to lock the preset pinion 167, thus preventing uncontrolled rotation thereof.

The tether payout mechanism 150 includes a threaded drum nut spool 154 that is assembled onto the threaded stationary bolt 161 and configured to rotate thereon. The threaded drum nut spool 154 translates linearly along the longitudinal axis of the threaded stationary bolt 161 when rotated. The tether 15 is pre-wound on the threaded drum nut spool 154. In this embodiment, the tether 15 is only unwound from the threaded drum nut spool 154 during a deployment of the airbag cushion 20.

In operation, a payout of the tether 15 associated with deployment of the airbag cushion 20 causes the threaded drum nut spool 154 to rotate, and thus linearly translate along the longitudinal axis of the threaded stationary bolt 161. When the threaded drum nut spool 154 contacts the preset nut 166, it stops rotating, thus stopping payout of the tether 15 at the preferred deployed length. The preferred deployed length is preset by locating the preset nut 166 at a position that is associated with the preferred deployed length. Payout of the tether 15 is associated with deployment of the airbag cushion 20.

In this embodiment, the preset nut 166 and the threaded drum nut spool 154 act as a double nuts and bolt combination, with the preset nut 166 serving as an adjustable stopper to regulate the number of turns of the threaded drum nut spool 154 along the threaded stationary bolt 161.

The preferred deployed length of the tether 15 can be preset over a continuous range between $l_0$ and $l_0+n\pi D_{104}$, where $l_0$ is a base tether length, n is a maximum number of allowable turns for threaded drum nut spool 154, and $D_{104}$ is an outer diameter of the threaded drum nut spool 154. Presetting the preferred deployed length of the tether 15 includes translating the preset nut 166 along the longitudinal axis of the threaded stationary bolt 161 by m quantity of turns such that the threaded drum nut spool 154 engages and interferes with the preset nut 166 after the threaded drum nut spool 154 rotates n minus m quantity of turns during deployment of the airbag cushion 20. The m quantity of turns of the preset nut 166 is associated with the preferred deployed length of the tether 15, and can be a whole number of turns or a whole number of turns and a fraction thereof.

Figure 7A:
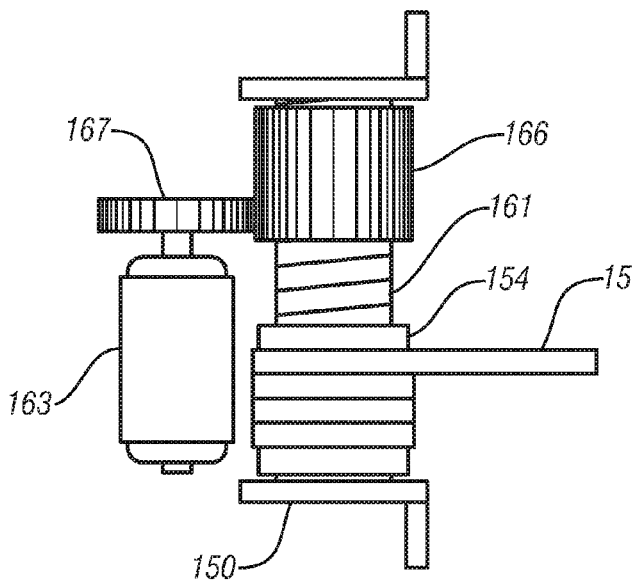
FIGS. 7A, 7B, and 7C are schematic diagrams of operation of the exemplary tether length adjustment mechanism of FIG. 6 in accordance with the present disclosure.
Figure 7B:
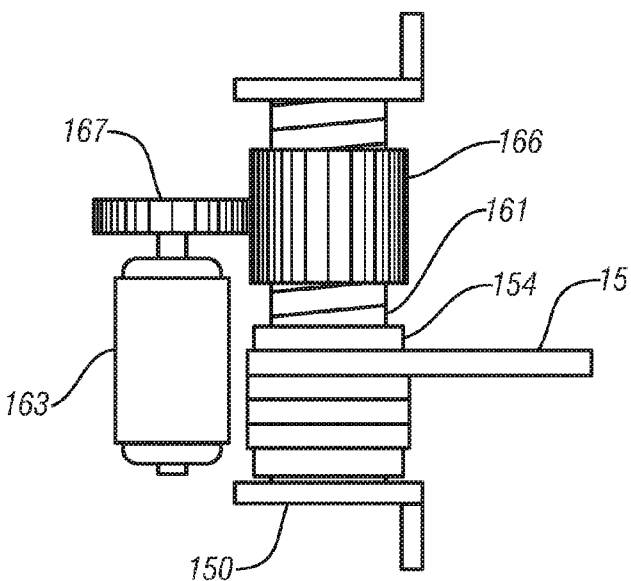
Figure 7C:
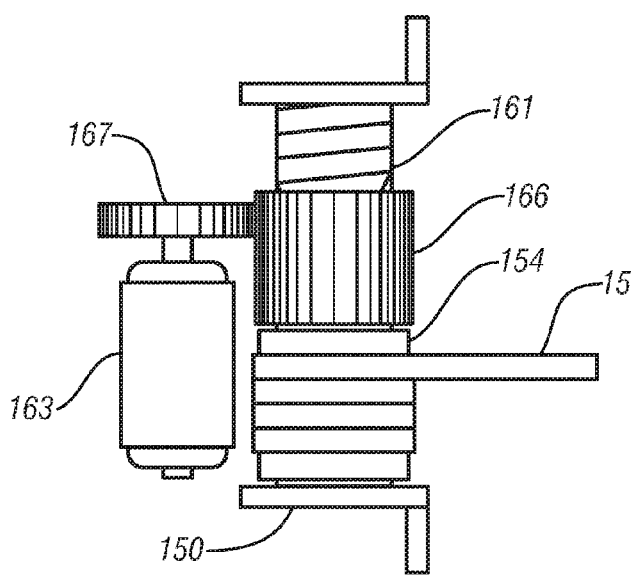

FIGS. 7A, 7B, and 7C depict the embodiment shown in FIG. 6, including showing positions of the preset nut 166 associated with three preferred deployed lengths of the tether 15, including a maximum preferred deployed length of the tether 15 (FIG. 7A), an intermediate preferred deployed length of the tether 15 (FIG. 7B) and a minimum preferred deployed length of the tether 15 (FIG. 7C). Prior to deployment, the tether payout mechanism 150 is not affected by positioning of the preset nut 166 regardless of the preferred deployed length of the tether 15.

FIG. 7A shows a maximum preset for the preferred deployable length of the tether 15, in which the preset nut 166 is placed n quantity of turns away from the drum nut spool 154 by the actuator 163 and preset pinion 167. During deployment of the airbag cushion 20, the tension force provided by deployment pulls the tether 15, spooling out the tether 15 from rotating drum nut spool 154 and moving the rotating drum nut spool 154 along the longitudinal axis of the threaded stationary bolt 161 towards the preset nut 166. The tether payout operation is stopped after the rotating drum nut spool 154 interferes with the preset nut 166, which stops rotating after making n turns. This maximum preferred deployable length can be chosen as a default preset when specific occupant characteristics are unavailable.

FIG. 7B shows an intermediate preset for the preferred deployable length of the tether 15, in which the preset nut 166 is rotated m quantity of turns toward rotating drum nut spool 154 by the actuator 163 and preset pinion 167, allowing the rotating drum nut spool 154 to freely rotate n minus m quantity of turns when tether 15 is pulled during deployment of the airbag cushion 20.

FIG. 7C shows a minimal preset for the preferred deployable length of the tether 15, in which preset nut 166 is placed against rotating drum nut spool 154 such that no additional payout of the tether 15 is possible. The preferred deployable length of the tether 15 is associated with that portion which is contained solely in the airbag cushion 20.

Figure 8:
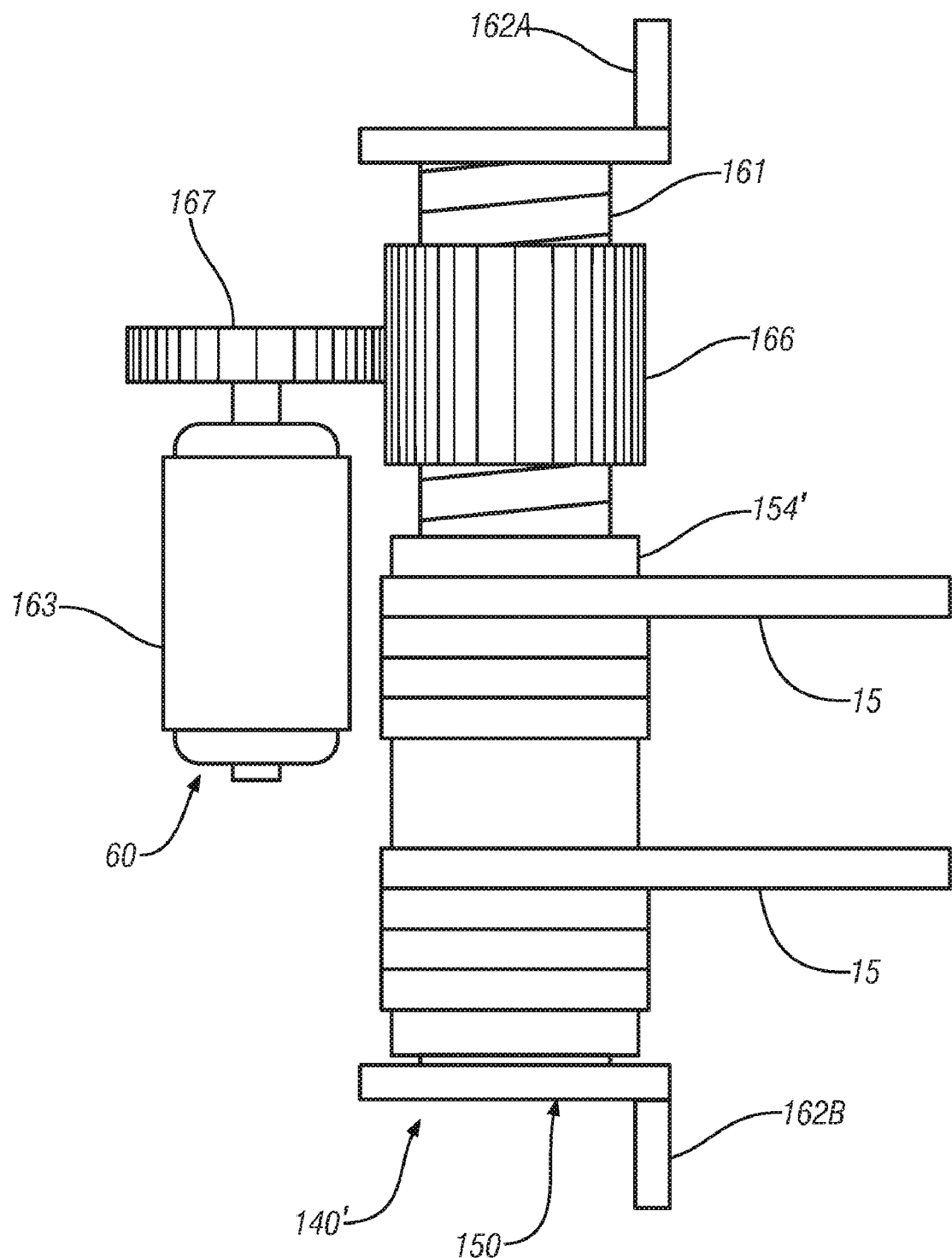
FIG. 8 is a schematic diagram of an embodiment of an exemplary tether length adjustment mechanism in accordance with the present disclosure.

FIG. 8 shows an alternate embodiment of the tether control mechanism 140', including tether payout mechanism 150 and tether length adjustment mechanism 160. In this embodiment the rotating drum nut spool 154' has first and second tethers 15 rotated thereon.

It will be appreciated that the continuously variable and presettable tether control mechanism 40, 140 including the tether payout mechanism 50, 150 and tether length adjustment mechanism 60, 160 may also be used in conjunction with and/or also varied based upon a particular impact situation using the vehicle dynamics sensing device(s) 35. It will further be appreciated that the occupant restraint device may also be tuned even further using an inflation device that has one or more discharge levels.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An occupant restraint device, comprising:
an inflatable airbag cushion;
a tether including a first end connected to the airbag cushion and a second end connected to a tether control mechanism;
the tether control mechanism including a tether payout mechanism and a tether length adjustment mechanism;
the tether length adjustment mechanism configured to control a length of tether available for payout by the tether payout mechanism; and
the tether payout mechanism operationally decoupled from the tether length adjustment mechanism;
wherein the tether payout mechanism comprises the tether pre-wound onto a threaded drum nut spool assembled on a threaded stationary bolt, the threaded drum nut spool configured to translate linearly along a longitudinal axis of the threaded stationary bolt when rotated thereon; and
wherein the tether length adjustment mechanism comprises a preset nut assembled on the threaded stationary bolt, the preset nut configured to translate linearly along the longitudinal axis of the threaded stationary bolt when rotated thereon, and an actuator configured to rotate the preset nut to linearly translate the preset nut along the longitudinal axis of the threaded stationary bolt.

2. The occupant restraint device of claim 1, wherein the preset nut interferes with and stops rotation of the threaded drum nut spool at a predetermined position, whereby the length of the tether available for payout corresponds to the predetermined position of the preset nut.

3. The occupant restraint device of claim 1, further comprising an occupant sensing mechanism characterizing an occupant and determining the length of tether available for payout by the payout mechanism based upon the occupant characterization.

4. An occupant restraint device, comprising:
an inflatable airbag cushion connected to a first end of a tether connected to a tether control mechanism including operationally decoupled tether length adjustment and tether payout mechanisms;
a control module for characterizing an occupant and controlling the tether length adjustment mechanism to establish a length of tether available for payout by the tether payout mechanism corresponding to the characterized occupant;
wherein the tether payout mechanism comprises the tether pre-wound onto a threaded drum nut spool assembled on a threaded stationary bolt, the threaded drum nut spool configured to translate linearly along a longitudinal axis of the threaded stationary bolt when rotated thereon; and
wherein the tether length adjustment mechanism comprises a preset nut assembled on the threaded stationary bolt, the preset nut configured to translate linearly along the longitudinal axis of the threaded stationary bolt when rotated thereon.

5. The occupant restraint device of claim 4, wherein the tether length adjustment mechanism further comprises an actuator for rotating the preset nut to linearly translate the preset nut along the longitudinal axis of the threaded stationary bolt to a predetermined position corresponding to the length of tether available for payout by the tether payout mechanism corresponding to the characterized occupant.

6. The occupant restraint device of claim 4, wherein the preset nut interferes with and stops rotation of the threaded drum nut spool thereby establishing the length of tether available for payout by the tether payout mechanism.

7. The occupant restraint device of claim 4, wherein the control module controls the tether length adjustment mechanism to establish the length of tether available for payout by the tether payout mechanism corresponding to the characterized occupant prior to deployment of the airbag cushion.

8. An occupant restraint device, comprising:
- an inflatable airbag cushion;
- a tether including a first end connected to the airbag cushion and a second end pre-wound onto a threaded drum nut spool assembled on a threaded stationary bolt and configured to translate linearly along a longitudinal axis of the threaded stationary bolt when rotated thereon; and
- a preset nut assembled on the threaded stationary bolt, the preset nut configured to translate linearly along the longitudinal axis of the threaded stationary bolt when rotated thereon and being set a predetermined distance from the threaded drum nut spool;
- wherein a deployment of the airbag cushion pulls the tether thus rotating the threaded drum nut spool and translating the threaded drum nut spool along the threaded stationary bolt until stopped by the preset nut.

9. The occupant restraint device of claim 8, further comprising an actuator for rotating the preset nut to linearly translate the preset nut along the longitudinal axis of the threaded stationary bolt to the predetermined distance from the threaded drum nut spool.

* * * * *